United States Patent [19]

Kawaguchi et al.

[11] 4,295,512

[45] Oct. 20, 1981

[54] THICK-CORD LIGHTWEIGHT TIRE BODY HAVING AN IMPROVED FATIGUE LIFE

[75] Inventors: Yasuyosi Kawaguchi, Higashiyamato; Munetoshi Shimotake, Kodaira; Fujio Yamamoto, Kodaira, all of Japan

[73] Assignee: Bridgestone Tire Company Limited, Tokyo, Japan

[21] Appl. No.: 183,900

[22] Filed: Sep. 4, 1980

[30] Foreign Application Priority Data

Sep. 4, 1979 [JP] Japan .................... 54-112366

[51] Int. Cl.$^3$ .................. B60C 9/06; B60C 15/06
[52] U.S. Cl. .................. 152/354 R; 152/357 R; 152/362 R; 152/359; 260/5; 260/42.32; 260/42.47; 525/232; 525/236; 525/241
[58] Field of Search .............. 152/330 R, 354-356, 152/357 R, 359, 374, 362 R, 362 LS, 360; 260/5, 33.6 A, 33.6 AQ, 42.32, 42.47; 525/232, 236, 241

[56] References Cited

U.S. PATENT DOCUMENTS

| | | | |
|---|---|---|---|
| 3,674,078 | 7/1972 | Sasaki et al. | 152/330 R |
| 3,682,223 | 8/1972 | Simpson | 152/362 R |
| 4,193,437 | 3/1980 | Powell | 152/330 R |
| 4,209,050 | 6/1980 | Yoshida et al. | 152/359 |
| 4,257,469 | 3/1981 | Uemura | 152/354 R |

Primary Examiner—Michael W. Ball
Assistant Examiner—Lois E. Boland
Attorney, Agent, or Firm—Sughrue, Mion, Zinn, Macpeak & Seas

[57] ABSTRACT

A thick-cord lightweight tire body having an improved fatigue life is disclosed. The tire body comprises a bias-structured carcass composed of rubberized plies each including thick organic fiber cords and rubber interposed between the carcass plies. The rubber has a thickness corresponding to hm/ho ≦ 0.5, where hm is an average rubber gauge between the plies at a center position in a widthwise direction of tire and, ho is a diameter of the thick cord, and is a rubber composition consisting essentially of 100 parts by weight of a rubber component and 50–70 parts by weight of carbon black. The rubber component is a mixture of 60–95 parts by weight of a rubber and 5–40 parts by weight of a liquid polymer having a viscosity-average molecular weight of $3 \times 10^4$–$10 \times 10^4$. The rubber composition has a dynamic modulus of elasticity E' at 100° C. under 2% elongation given by $E' \geq 6.0 \times 10^7$ dyne/cm$^2$, a dynamic loss angle tan δ given by tan δ ≦ 0.095 and a tensile strength of not less than 100 kg/cm$^2$ as properties after vulcanization.

3 Claims, 1 Drawing Figure

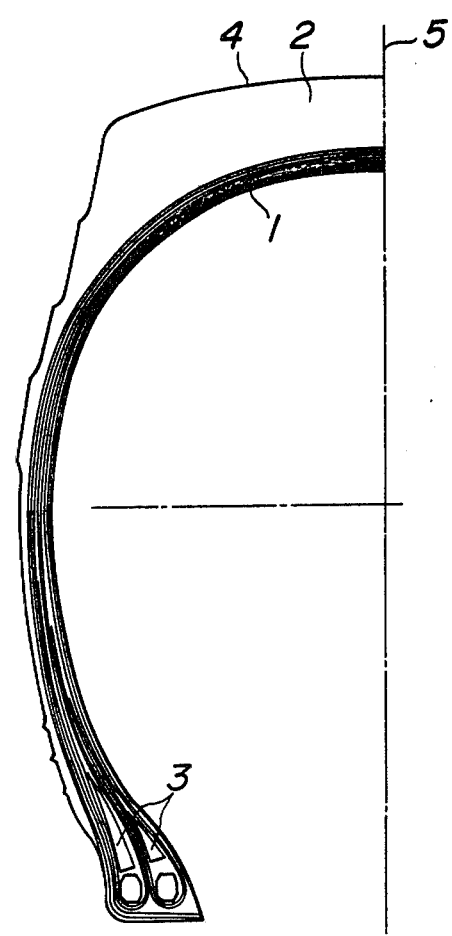

THICK-CORD LIGHTWEIGHT TIRE BODY HAVING AN IMPROVED FATIGUE LIFE

The present invention relates to thick-cord lightweight tire bodies having an improved fatigue life, and more particularly to a thick-cord lightweight pneumatic tire body having a bias-structured carcass, which has a remarkably improved durability. It is adapted to be used for heavy vehicles, such as bus, truck and the like, and can be produced in a high productivity.

In the pneumatic tires for heavy vehicles, there has hitherto been provided a carcass composed of rubberized ply layers each containing relatively thin nylon cords of, for example, from 840 d/2 to about 1,260 d/2. The tire usually formed by laminating 8 or more carcass plies one upon another to cross each other at a predetermined cord angle.

Recently, a requirement has arisen to satisfy the demands due to higher speed travelling of vehicles, resulting from the perfection of paved roads, improvement of transportation efficiency accompanied therewith and the like. Now, tires provided with the carcass of the above type are constructed so that (i) the number of carcass plies required for holding the strength of the carcass under severe use conditions is large and hence (ii) the total amount of rubber to be interposed between the carcass plies is also large. As a result, not only are such tires disadvantageous in the number of working steps, tire weight and cost, but also the result falls short of expectations in the heat durability, which particularly comes into question during the continuous running over a long distance at a high speed.

On the other hand, it is necessary to improve the productivity in the manufacture of the above tire. For this purpose, it has been proposed to decrease the number of carcass plies to be used by using relatively thick nylon cords of, for example, from 1,890 d/2 to 1,890 d/3 or more as a carcass ply cord to enhance the strength of the cords themselves. Hence the above mentioned disadvantages are intended to be solved.

The inventors have confirmed from various experiments that the above attempt achieves good results in the productivity, tire weight, cost and particularly heat durability of tread portion. However, there are resulting degradations of wear resistance as a most important performance in the tires of this type and fatigue resistance of the carcass. Therefore, this concept has not yet been put to practical use.

The inventors have further made various investigations, and found out that the composition of rubber for ply coating, particularly the compounding quantity of carbon black and the properties of the rubber composition after vulcanization are important together with the ratio of its gauge, particularly an average rubber gauge at a center position in a widthwise direction of the tire to a cord diameter of the thick cords constituting the carcass ply. Further the above described drawbacks can be solved, as disclosed in the copending U.S. Patent Application Ser. No. 104,217, by defining the ratio of the above described average gauge of the rubber composition of the cord diameter of thick cord and the physical properties of the rubber interposed between the plies.

However, when a rubber is compounded with a large amount of carbon black having a high reinforcing property in order to improved its fatigue registance in the use as a carcass, the resulting rubber composition is poor in the fluidity in the unvulcanized state and generates a large amount of heat in itself. Therefore, the rubber composition is scorched when the rubber composition is kneaded by means of a Banbury mixer or is formed into a sheet by a roll. In order to prevent the scorching phenomenon, it is necessary to decrease the amount of rubber to be kneaded at one time in a Banbury mixer or to lower the rolling speed. Such procedure noticeably lowers the productivity of tire.

The inventors have made various investigations in order to solve the above described drawbacks and found out that, when the addition of low molecular weight liquid polymer to rubber for ply coating forms three dimensional structure in the rubber at the vulcanization as described in our copending U.S. Patent Application Ser. No. 76,536, now U.S. Pat. No. 4,261,403 the above described drawbacks can be obviated and accomplished the present invention.

The feature of the present invention lies in a thick-cord lightweight tire body having an improved fatigue life, comprising a bias-structured carcass composed of rubberized plies each including thick organic fiber cords and rubber interposed between said carcass plies and having a thickness corresponding to $hm/ho \leq 0.5$ where hm is an average rubber gauge between said plies at a center position in the widthwise direction of the tire and ho is a diameter of said thick cord. The rubber is a rubber composition consisting essentially of 100 parts by weight of a rubber component and 50–70 parts by weight of carbon black. The rubber component is a mixture of 60–95 parts by weight of at least one rubber selected from the group consisting of natural rubber, synthetic polyisoprene rubber, polybutadiene rubber and styrene-butadiene copolymer rubber and 5–40 parts by weight of at least one liquid polymer selected from the group consisting of liquid polybutadiene, liquid polyisoprene and liquid styrene-butadiene copolymer and having a viscosity-average molecular weight of $3 \times 10^4 - 10 \times 10^4$. The rubber composition has a dynamic modulus of elasticity at 100° C. under 2% elongation of not less than $6.0 \times 10^7$ dyne/cm$^2$, a dynamic loss angle tan $\delta$ of not more than 0.095 and a tensile strength of not less than 100 kg/cm$^2$ as properties after vulcanization.

Throughout the specification, the term "thick cords" constituting the carcass ply means to include nylon cords of from 1,890 d/2 to 1,890 d/3 or more and organic fiber cords having a cord diameter equal to or larger than that of said nylon cord, such as polyester cords, rayon cords, vinylon cords and the like.

In the bias-structured carcass using such thick cords, rubber interposed between the carcass plies has a thickness such that a ratio of average rubber gauge (hm) between the mutual plies embedded in the rubber body of the tire at a center position in the widthwise direction of the tire to cord diameter (ho) of the thick cords is $hm/ho \leq 0.5$, preferably $hm/ho \leq 0.45$.

The term "rubber gauge between the plies" used herein is defined by a minimum space between the cords crossed with each other at the ply laminate mutually superimposed one upon another. Particularly, the average rubber gauge is called into question due to the fact that the rubber gauge between the plies near the tread is usually selected to be thicker than that in the inner plies as mentioned above.

In the practice of the invention, it is more desirable to select a ratio of the average rubber gauge (hm') between two or three plies from the outermost ply toward the inside of the carcass to the cord diameter (ho) of the thick cords within a range of 0.2–0.7, preferably 0.3–0.55.

The rubber component of the rubber interposed between the plies uses a mixture of 60–95 parts by weight of at least one rubber selected from the group consisting of natural rubber, synthetic polyisoprene rubber, polybutadiene rubber, styrene-butadiene copolymer rubber and 5–40 parts by weight of at least one liquid polymer selected from the group consisting of liquid polybutadiene, liquid polyisoprene and liquid styrene-butadiene copolymer and having a viscosity-average molecular weight of $3 \times 10^4$–$10 \times 10^4$. When the amount of the liquid polymer is less than 5 parts by weight, the effect of the liquid polymer decreases the heat build-up in the resulting unvulcanized rubber composition. When the amount of the liquid polymer exceeds 40 parts by weight, heat is easily built-up in the resulting rubber composition after vulcanization. Therefore, the use of the liquid polymer in an amount of less than 5 parts by weight or more than 40 parts by weight is not preferable. Moreover, it is necessary that the liquid polymer has a viscosity-average molecular weight of $3 \times 10^4$–$10 \times 10^4$. When the viscosity-average molecular weight of the liquid polymer is smaller than $3 \times 10^4$, the liquid polymer contains a large amount of low molecular weight liquid polymer which does not crosslink during vulcanization, and the liquid polymer deteriorates the physical properties of the vulcanized rubber. When the molecular weight of the liquid polymer is larger than $10 \times 10^4$, the resulting rubber composition generates a large amount of heat during the vulcanization and causes scorching. Therefore, the use of a liquid polymer having a viscosity-average molecular weight outside the above described range is not preferable. Particularly, the liquid polymer having a viscosity-average molecular weight of $5 \times 10^4$–$8 \times 10^4$ is preferable. Among liquid polymers, liquid polybutadiene is particularly preferable in view of the heat durability of the resulting tire.

In the present invention, it is necessary to add 50–70 parts by weight of carbon black to 100 parts by weight of the above described mixture of rubber and liquid polymer. When the amount of carbon black is less than 50 parts by weight, the carbon black can not fully exhibit the reinforcing effect for rubber and the resulting vulcanized rubber has low durability. When the amount of carbon black exceeds 70 parts by weight, the resulting unvulcanized rubber composition generates a large amount of heat during kneading in the Banbury mixer and causes a scorching phenomenon. In the present invention, carbon black having an iodine adsorption value (IA) of 40–90 mg/g and a dibutyl phthalate absorption value (DBP) of 60–140 ml/100 g is preferably used.

With the above described rubber compounding, particularly with the use of the above selected liquid polymer, the fatigue resistance of the carcass is advantageously improved, and, the scorching phenomenon of the resulting unvulcanized rubber composition can be prevented during kneading in a Banbury mixer and at the formation of sheets by means of a roll. Accordingly, the lowering of productivity can be prevented.

In the above defined rubber composition according to the invention, a dynamic modulus of elasticity (E') measured at 100° C. under 2% elongation must be given by, $E' \leqq 6.0 \times 10^7$ dyne/cm$^2$, preferably $7.0$–$8.0 \times 10^7$ dyne/cm$^2$ as a property after vulcanization. The wear resistance of the tire using the thick cords is improved without increasing the total gauge of the carcass, and particularly the durability of the bead portion is improved.

Further, the rubber composition after vulcanization has a tensile strength at 100° C. of not less than 100 kg/cm$^2$, preferably not less than 120 kg/cm$^2$, which is required to prevent the growth of separation nucleus and suppress the formation of the nucleus at minimum. A dynamic loss angle tan δ at 100° C. is not more than 0.095, preferably not more than 0.080, and is advantageous to suppress the growth of separation nucleus.

Regarding the dynamic modulus of elasticity, a ratio of the dynamic modulus of the apex rubber for stiffening the turnup portion of the carcass to that of the rubber body between the plies is selected to be within a range of 0.9–1.3, preferably 1–1.1. The concentration of strain, which is frequently apt to occur in the vicinity of the boundary between the turnup portion and the apex rubber, can be avoided to prevent the formation and growth of separation nucleus.

The reason why the ratio of the average rubber gauge hm between the plies at the center position in the widthwise direction of tire to the cord diameter ho is limited to hm/ho ≦ 0.5 is based on the following fact. That is, even when the ratio hm/ho exceeds 0.5, the maximum shearing strain near the boundary between the cord and the rubber is inherently small and the rigidity as the ply laminate is well-balanced, to eliminate problems in the conventional carcass using thin organic fiber cords, but the use of thick cords according to the invention has drawbacks in that the total gauge of the carcass becomes thicker and the heat durability of the tread is deteriorated.

The reason why the dynamic loss angle tan δ at 100° C. of the rubber for coating the plies each composed of organic fiber cords is limited to not more than 0.095 is based on the following fact. That is, when tan δ exceeds 0.095, heat build-up inside the tire increases to raise the tire temperature, so that not only is heat durability deteriorated, but also fatigue of rubber is promoted and the tensile strength is reduced, and consequently the growth of separation nucleus becomes larger.

The reason why the dynamic modulus of elasticity E' (2% elongation) at 100° C. of the rubber for coating the plies each composed of organic fiber cords is limited to not less than $6.0 \times 10^7$ dyne/cm$^2$ is based on the following fact. That is, when E' (2% elongation) is less than $6.0 \times 10^7$ dyne/cm$^2$, if the rubber gauge between the cords in the ply laminate is made small, the rigidity of the ply laminate is poor when compared with that of the carcass using relatively thin cords, so that carcass deformation becomes large. Furthermore, the force for suppressing the carcass deformation with the advance of wear is poor, so that wear resistance lowers. Moreover, the deformation of the bead portion becomes large, so that the stress concentration in the bead portion is increased to promote the growth of separation nucleus, resulting in the lowering of the durability.

The reason why the tensile strength at 100° C. of the rubber for coating the plies each composed of organic fiber cords is limited to not less than 100 kg/cm$^2$ is due to the fact that, even when the quantity of carbon black and the dynamic loss angle are within the above defined ranges, if the tensile strength at 100° C. is less than 100 kg/cm$^2$, the fatigue life aimed at in the invention cannot be obtained. This has been proved from experimental results.

The reason why the ratio in the dynamic modulus of elasticity E' (2% elongation) of the apex rubber to the rubber for coating the plies each composed of organic fiber cords is limited to a range of 0.9–1.3 is as follows. When the cord diameter of the carcass ply is made large and the rubber gauge between the carcass plies is thinned, the rigidity of the carcass at the bead portion is reduced to make the deformation of the carcass large. A portion of the carcass contacting with a rim is therefore subjected to damage by abrasion. As a result, it would be desirable to increase the values of E' (2% elongation) in the ply coating rubber and apex rubber as far as possible, but E' of the ply coating rubber is restricted from other properties of the carcass. Therefore, when E' of the apex rubber is made larger than that of the ply coating rubber, damage by abrasion can be suppressed, but the different level of the rigidity is caused at the upper end of the apex rubber, so that the separation nucleus is apt to grow at the bead portion. On the other hand, when E' of the apex rubber is smaller than that of the ply coating rubber, the rigidity of the bead portion reduces and the damage by abrasion is apt to be caused. Also, the separation nucleus is apt to grow due to the different level of rigidity like the former case. Judging from the above facts, the practical range of the ratio in the dynamic modulus of elasticity of of the apex rubber to the ply coating rubber is 0.9–1.3.

The thinner the rubber gauge between the carcass plies, the more the tire temperature lowers, so that the thinning of the rubber gauge is advantageous in view of the heat degradation and heat durability. Further, the degree of freedom for thinning the rubber gauge is large in the tread side where the rubber gauge between the carcass plies is particularly thick. If the rubber gauge becomes too thin, however, the shearing strain naturally increases. As a result, the growth of separation nucleus cannot be prevented even if the tensile strength of the rubber is sufficiently large. As a result of various examinations, it has been found that the weight, heat durability and fatigue durability are particularly well-balanced by limiting a ratio of average rubber gauge (hm') between the plies near the tread side or between two or three plies from the outermost ply toward the inside of the carcass to the cord diameter (ho) to $0.2 \leq hm'/ho \leq 0.7$.

As described above, according to the present invention, thick organic fiber cords are used in the carcass of a pneumatic tire having a bias-structured carcass, particularly in the carcass of the pneumatic tire used for heavy vehicles, such as bus, truck and the like. Further, a rubber having a remarkably improved fatigue resistance is used as the rubber interposed between the plies in order to make the weight of the tire light and to improve remarkably the durability thereof, and additionally liquid polymer is added to the rubber between the plies to suppress heat build-up in the rubber during the vulcanization. Therefore, according to the present invention, a tire body having a bias-structured carcass and adapted to be used in heavy vehicles can be produced in a high productivity.

Further, the use of liquid polymer can decrease the amount of softeners, such as aromatic oil and the like, which has been used in the conventional rubber composition in order to prevent the heat generation of rubber composition at the vulcanization. Therefore, fatigue resistance of the rubber between the plies after vulcanization can be improved.

The invention will be described below with reference to an example based on the accompanying drawing.

EXAMPLE

The single FIGURE is a schematic radial half section of a test tire having a size of 10.00-20 14PR.

In this FIGURE, numeral 1 is a carcass, numeral 2 a tread portion, numeral 3 an apex rubber, numeral 4 a tread surface and numeral 5 represents a center position in the widthwise direction of the tire.

The heat generation in the various rubber compositions shown in Table 1 that follows was measured after the rubber composition was kneaded for 3 minutes at an initial temperature of 70° C. and at 120 rpm by means of a plastometer made by Brabender Co. in West Germany. Further, the rubber compositions were vulcanized under a condition of 150° C.×30 minutes, and the resilience, 300% modulus, tensile strength, dynamic modulus of elasticity and dynamic loss angle of the vulcanizates were measured.

The resilience, 300% modulus and tensile strength were measured according to JIS K6301. The dynamic modulus of elasticity was measured with respect to a strip-shaped sample having a length of 25 mm, a width of 5 mm and a thickness of 2 mm by vibrating the sample at a frequency of 10 Hz under a dynamic strain of 2% by means of a high-power spectrometer made by Iwamoto Seisakusho, while keeping the sample at 100° C. and at an elongated state of 2% under static pressure. The dynamic loss angle was measured with respect to the value at 100° C. by means of a vibration type dynamic viscoelasticity measuring apparatus.

Then, a sample tire having a hm/ho ratio of 0.4 and a hm'/ho ratio of 0.45 was produced using a carcass consisting of six carcass plies each including 1,890 d/2 nylon cords and the above described rubber composition as a rubber interposed between the plies, and the durability of the tire was evaluated by a drum test. In the test, a sample tire continuously travelled at a speed of 60 km/hr until the tire was broken under a condition of a rim of 7.00T, an internal pressure of 6.75 kg/cm² and a load per tire of 112% of the standard load defined in JIS and the travelling distance of the tire was indicated by an index based on the index 100 of the travelling distance of the tire of Experiment No. 1. The larger index a tire has, the higher durability the tire has.

The obtained results are shown in the following Table 1.

TABLE 1

| Experiment No. | Comparative tire | | | | Tire of this invention | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Compounding recipe (parts by weight) | | | | | | | | | | | | |
| Natural rubber | 100 | 100 | 85 | 95 | 85 | 85 | 85 | 60 | 85 | 85 | 85 | 85 |
| Liquid polybutadiene (9 × 10³) | | | 15 | | | | | | | | | |
| Liquid polybutadiene (3 × 10⁴) | | | | 5 | 15 | | | | | | | |
| Liquid polybutadiene (5 × 10⁴) | | | | | | 15 | | | | | 15 | 15 |
| Liquid polybutadiene (7 × 10⁴) | | | | | | | 15 | 40 | | | | |
| Liquid polybutadiene (10 × 10⁴) | | | | | | | | | 15 | | | |

TABLE 1-continued

| Experiment No. | Comparative tire | | | Tire of this invention | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Liquid polyisoprene (3 × 10$^4$) | | | | | | | | | | 15 | | |
| HAF carbon black | 60 | 65 | 60 | 60 | 60 | 60 | 60 | 60 | 60 | 60 | 60 | 60 |
| Aromatic oil | 20 | 20 | 20 | 20 | 20 | 20 | 20 | 18 | 20 | 20 | 18 | 5 |
| Stearic acid | 2 | 2 | 2 | 2 | 2 | 2 | 2 | 2 | 2 | 2 | 2 | 2 |
| Zinc white | 3 | 3 | 3 | 3 | 3 | 3 | 3 | 3 | 3 | 3 | 3 | 3 |
| N-phenyl-N'-isopropyl-p-phenylenediamine | 1.0 | 1.0 | 1.0 | 1.0 | 1.0 | 1.0 | 1.0 | 1.0 | 1.0 | 1.0 | 1.0 | 1.0 |
| N-oxydiethylene-2-benzothiazylsulfeneamide | 1.5 | 1.5 | 1.5 | 1.5 | 1.5 | 1.5 | 1.5 | 1.5 | 1.5 | 1.5 | 1.5 | 1.5 |
| Sulfur | 3.0 | 3.0 | 3.0 | 3.0 | 3.0 | 3.0 | 3.0 | 3.0 | 3.0 | 3.0 | 3.0 | 3.0 |
| Property of rubber | | | | | | | | | | | | |
| Heat build-up temperature by plastometer (°C.) | 118 | 130 | 102 | 114 | 105 | 110 | 113 | 105 | 117 | 108 | 112 | 121 |
| Resilience (%) | 62 | 59 | 54 | 60 | 58 | 61 | 62 | 59 | 63 | 59 | 61 | 66 |
| 300% modulus (kg/cm$^2$) | 150 | 165 | 127 | 147 | 139 | 145 | 147 | 134 | 148 | 143 | 149 | 164 |
| Dynamic modulus of elasticity (× 10$^7$ dyne/cm$^2$) | 7.5 | 8.1 | 6.7 | 7.4 | 7.2 | 7.3 | 7.3 | 7.1 | 7.4 | 7.3 | 7.4 | 7.9 |
| Dynamic loss angle tan δ | 0.075 | 0.090 | 0.120 | 0.085 | 0.095 | 0.080 | 0.085 | 0.095 | 0.070 | 0.085 | 0.080 | 0.060 |
| Tensile strength (kg/cm$^2$) | 144 | 126 | 152 | 145 | 141 | 144 | 142 | 135 | 143 | 142 | 145 | 130 at least |
| Durability of tire | 100 | 155 | | | 110 | | | | | | 140 | 200 |

A heat build-up temperature of not higher than 120° C. of a rubber composition in the plastometer test means that the rubber composition can be vulcanized without substantially causing scorch and without deteriorating the productivity. Therefore, it can be seen from Table 1 that, according to the present invention, a lightweight and durable tire body having a bias-structured carcass and adapted to be used in heavy vehicles can be produced in a high productivity.

What is claimed is:

1. A thick-cord lightweight tire body having an improved fatigue life, comprising a bias-structured carcass composed of rubberized plies each including thick organic fiber cords having a cord diameter equal to or larger than Nylon 1,890 d/2 and rubber interposed between said carcass plies and having a thickness corresponding to hm/ho≦0.5 where hm is an average rubber gauge between said plies at a center position in the widthwise direction of the tire and ho is a diameter of said thick cord, said rubber being a rubber composition consisting essentially of 100 parts by weight of a rubber component and 50-70 parts by weight of carbon black, said rubber component being a mixture of 60-95 parts by weight of at least one rubber selected from the group consisting of natural rubber, synthetic polyisoprene rubber, polybutadiene rubber and styrene-butadiene copolymer rubber and 5-40 parts by weight of at least one liquid polymer selected from the group consisting of liquid polybutadiene, liquid polyisoprene and liquid styrene-butadiene copolymer and having a viscosity-average molecular weight of $3 \times 10^4$–$10 \times 10^4$, said rubber composition having a dynamic modulus of elasticity at 100° C. under 2% elongation of not less than $6.0 \times 10^7$ dyne/cm$^2$, a dynamic loss angle tan δ of not more than 0.095 and a tensile strength of not less than 100 kg/cm$^2$ as properties after vulcanization and, an apex rubber for stiffening a turnup portion of said carcass wherein a ratio in the dynamic modulus of elasticity of said apex rubber to said rubber interposed between the plies is within a range of 0.9–1.3.

2. A tire body as claimed in claim 1, wherein said carbon black has an iodine adsorption value (IA) of 40–90 mg/g and a dibutyl phthalate absorption value (DBP) of 60–140 m/l/100 g.

3. A tire body as claimed in claim 1, wherein said rubber has a thickness corresponding to 0.2≦hm'/ho≦0.7 where hm' is an average rubber gauge between two or three plies from the outermost ply toward the inside of said carcass at the center position in the widthwise direction of the tire and ho is diameter of said thick cord.

* * * * *